United States Patent
Badarneh

(10) Patent No.: US 6,688,192 B1
(45) Date of Patent: Feb. 10, 2004

(54) PEDAL DEVICE

(76) Inventor: Ziad Badarneh, Carl Kjelsens vei 34, N-0874 Oslo (NO)

(*) Notice: Subject to any disclaimer, the term of this patent is extended or adjusted under 35 U.S.C. 154(b) by 0 days.

(21) Appl. No.: 10/031,270

(22) PCT Filed: May 6, 1999

(86) PCT No.: PCT/NO99/00048

§ 371 (c)(1),
(2), (4) Date: Oct. 25, 2001

(87) PCT Pub. No.: WO00/68067

PCT Pub. Date: Nov. 16, 2000

(51) Int. Cl.$^7$ ................................................ G05G 1/14
(52) U.S. Cl. ............................... 74/594.4; 74/560
(58) Field of Search ...................... 74/594.4, 594.1, 74/594.2, 594.7, 594.5, 594.6, 560; 482/57–65

(56) References Cited

U.S. PATENT DOCUMENTS

| | | | |
|---|---|---|---|
| 2,069,454 A | | 2/1937 | Lofquist et al. |
| 4,599,915 A | | 7/1986 | Hlavac et al. |
| 4,893,523 A | * | 1/1990 | Lennon ...................... 74/594.6 |
| 4,973,046 A | * | 11/1990 | Maxwell ...................... 482/60 |
| 5,142,938 A | * | 9/1992 | Sampson ................... 74/594.6 |
| 5,161,430 A | * | 11/1992 | Febey ........................ 75/594.7 |
| 5,411,456 A | * | 5/1995 | Lay ............................ 482/79 |
| 5,449,332 A | * | 9/1995 | Hervig ........................ 482/57 |
| 5,628,710 A | * | 5/1997 | Hervig ........................ 482/57 |
| 5,901,617 A | * | 5/1999 | Hervig ...................... 74/594.4 |
| 6,003,408 A | * | 12/1999 | Hervig ...................... 74/594.4 |
| 6,053,853 A | * | 4/2000 | Hinds ......................... 482/132 |
| 6,241,639 B1 | * | 6/2001 | Hervig ........................ 482/57 |

FOREIGN PATENT DOCUMENTS

| | | |
|---|---|---|
| EP | 0 130 152 A | 1/1985 |
| FR | 2 661 651 A | 11/1991 |

* cited by examiner

Primary Examiner—David A. Bucci
Assistant Examiner—Julie K. Smith
(74) Attorney, Agent, or Firm—Rodman & Rodman

(57) ABSTRACT

Pedal device for rotary attachment to a pedal crank arm of physical training apparatus, e.g. a bicycle, said device comprising a first pedal rotatably attached to a pedal shaft, said pedal shaft at a free end thereof firmly attachable to said crank arm, and said first pedal having a first pedal engagement face for use in carrying out conventional training exercise. Said device is provided with a second pedal tiltably attached to said first pedal about an axis extending transversely through a longitudinal axis of said pedal shaft and parallel to said first pedal face approximately midway between an inner and an outer end thereof. Said second pedal has second pedal engagement face facing away from said first pedal engagement face and spaced from said transversely extending axis, and said second pedal is tiltable to either side relative to said first pedal by an acute angle, e.g. in the range 0–35 degrees.

6 Claims, 3 Drawing Sheets

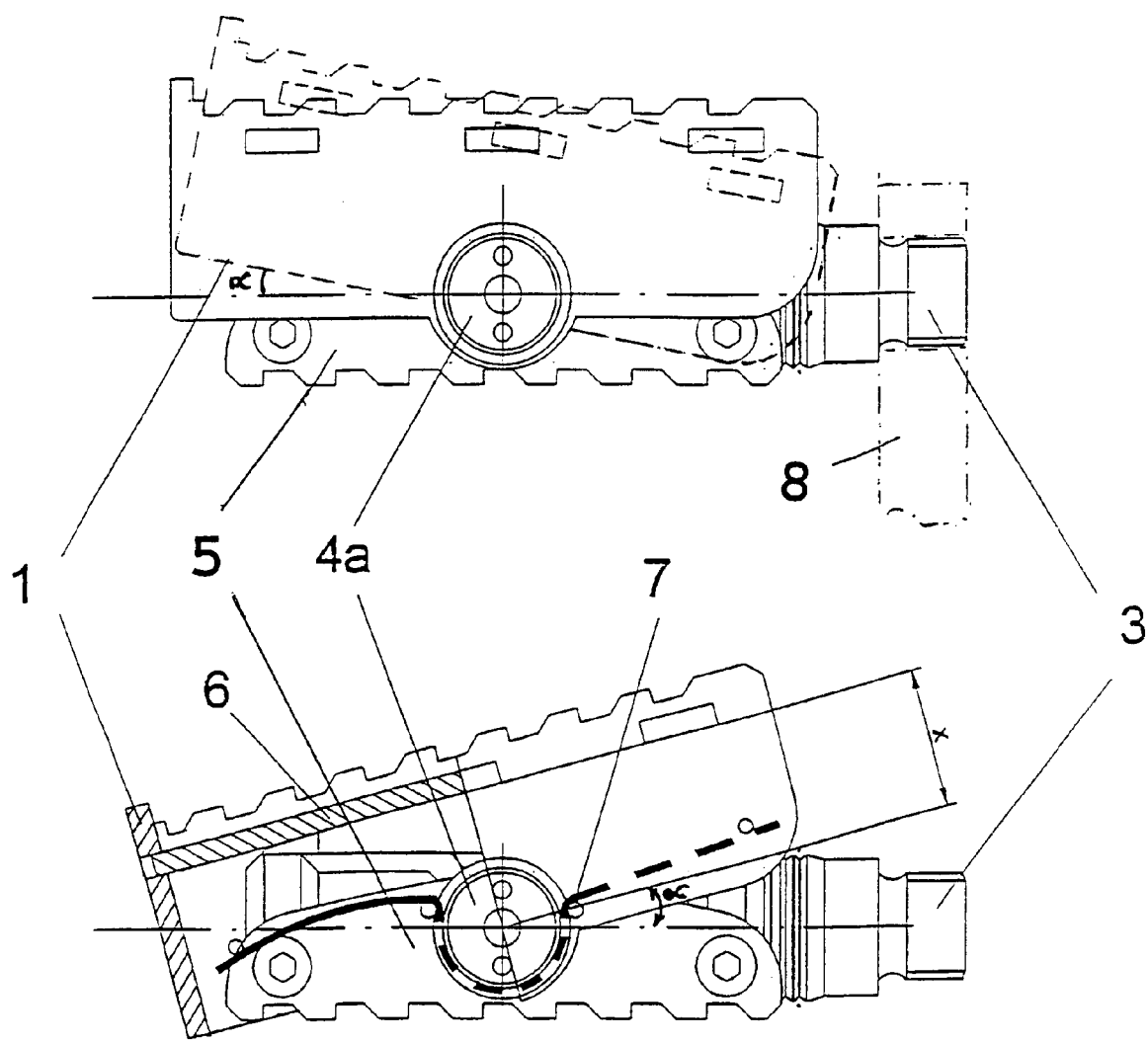

PEDAL DEVICE

The present invention relates to a pedal device for rotary attachment to a pedal crank arm of physical training apparatus, e.g. a bicycle, said device comprising a first pedal rotatably attached to a pedal shaft, said pedal shaft at a free end thereof firmly attachable to said crank arm, and said first pedal having a first pedal engagement face for use in carrying out conventional training exercise.

BACKGROUND OF INVENTION

A pedal device of said type is known from EP-A-0130152.

Ankle injuries account for a large share of the total number of injuries in the society and especially in sports. At present there are not to a sufficient extent alternative means available for preventing injuries, nor is there a good enough rehabilitation that is sufficiently stimulating and. motivating after injuries occur. The trend shows that human ankles are getting weaker and weaker muscular structure. There may be many reasons for this situation, but one hypothesis is that humans tend to move around much more on flat surfaces contrary to the situation years ago when time was spent moving on more uneven terrain. In addition, present day humans spend much more of the time on indoor activities. The immobilisation tendency is clearly demonstrated through many children which are driven to and from their "activities" and to a much greater extent than what was offered to former generations, in addition to spending of much of their time in front of a personal computer or a television set.

Data obtained from the National Institute of Public Health in Norway indicate that in Norway alone there are 200000 ankle injuries each year, approximately one third of which are treated at outpatient clinics or by physiotherapists. In about 20 percent of the cases reported there is persistent instability in the ankle after a sprain. Only half of these problem patients have confirmed diagnosis of ankle instability. This means that half of them only have subjective symptoms of instability without any diagnosis of an ankle that is mechanically unstable. There is speculation whether this may be due to poor joint sensation and reduced muscular control or a combination thereof. Several reports have shown weaken musculature after sprains and among patients with chronic unstable ankles, while others have not been able to prove any relationship. Inversion injuries make up 85 per cent of all ankle injuries and usually occur when landing after jumping, running or turning. Lateral ligaments are most vulnerable to injury during this injury mechanism. Usually the anterior talofibular ligament is the first to go—first degree, followed by the calcaneofibular ligament—second degree, and finally the posterior talofibular ligament—third degree. About 50% of the injuries only affect the anterior talofibular ligament, in 20% of the injuries the calcaneofibular ligament goes as well, and in 1% of the cases all three ligaments on the lateral side go. Studies have revealed through ankle arthroscopy simultaneous cartilage injuries in 66% of the ankle ligament injuries, and such patients had more complaints when followed up one year later. Such injury is usually caused then by compressing forces, as in falls. In more severe injuries fractures of medial malleolus can also occur. Combined supination injuries can also cause ordinary ankle fractures. Ankle injuries are thus complicated injuries in which many different types of injuries to cartilage, bone, ligaments and other stabilising soft tissues in the joints around the ankle can occur. It has also been shown that the skin has proprioceptive properties and is therefore important for ankle function and stability.

Usually an ankle sprain injury is treated with elevation, icing an immobilisation of the injured ankle in the form of a compression wrap. In some cases, crutches and analgesics are necessary during the first few days after the injury. Anti-inflammatory medication is frequently used with injuries of this kind. Functional treatment with taping, physiotherapy and a gradual increase of the load on the ankle usually leads to a good final result. Normal exercises are exercise bicycle, strengthening exercises, single-leg hops, balance training and proprioceptive training, e.g. with a balance board standing on one and both legs.

It would therefore be appreciated that ankle injuries are complicated and take considerable time to heal and edema in the ankle region caused by ankle injury can take a long time to disappear. As well known blood circulation in the ankle region may be seriously effected by an injury, which in some cases can cause a very long period of healing. In some cases the oedema may take years to disappear.

Thus, it has been a long felt need to provide training means which can stimulate not only blood circulation in the foot and ankle region, but also strengthen the muscular structure in the ankle region, thus providing the ankle region with an improved ability to withstand strain causing injury.

In the art of pedal devices references can be directed to French patent publication 2661651, U.S. Pat. No. 4,599,915, U.S. Pat. No. 5,161,430 and Norwegian patent 303869.

The French publication 2661651 relates to a bicycle pedal capable of turning both in the vertical and in the horizontal plan to avoid injuries even if the shoe of the pedal user is stuck in the pedal. Major disadvantages of such a pedal device is that it becomes to wobbly for the pedal user. The tilting of the device in the vertical direction can be adjustable by means of a wedge means defining the limits of degrees of tilting.

The pedal device is for specific use and can only be used in the context of being able to turn both in the vertical and horizontal planes. Use of the pedal device as a conventional pedal is not possible.

U.S. Pat. No. 4599915 relates to an adjustable pedal. The adjustable pedal comprises a platform mounted on a shaft for supporting the foot, and one or more of the following: means for positioning the platform along a radial axis generally perpendicular to the axis of the shaft to provide a lifted position for the foot, means permitting the platform to tilt about the radial axis in a direction generally parallel to the shaft axis to provide inverted an everted positions for the foot, and means permitting the platform to pivot about the radial axis to provide toe-in and toe-out positions for the foot. Once the platform has been correctly adjusted, it is clamped and the angular position will remain as adjusted.

U.S. Pat. No. 5,161,430 relates to a pedal radius adjustment device comprised of a frame mounted onto the existing crank arm of a bicycle or similar exercise machine by a screw passing through the existing crank arm pedal mounting hole and attaching to the adjustment frame, and by a bracket mounted to the adjustment frame around the crank arm. The contact side of the frame is grooved to align with the pedal crank arm. The pedal is attached to a sliding block within the adjustment frame and is adjusted by a hand operated pull T-pin at multiple, known-radius, settings prearranged on the adjustment frame. In another embodiment, the T-pin is held in place by magnetic attraction between the T-pin and the sliding block. The pedal of the device is a conventional pedal without any means for tilting the pedal relative to the crank arm.

Norwegian patent 303869 relates to an ankle strengthening bicycle pedal with the bicycle pedal attached in an adjustable manner either freely or lockable in a joint for an angular movement or setting during use of the pedals, respectively, relative to the pedal axis which is attached to a crank arm. The joint can be located in the midpoint of the pedal or at one end of the pedal adjacent the crank arm. The pedal shaft can be attached height shiftable and lockable in several positions of the crank arm longitudinal dimension by means of an elongate hole. However, this patent, does however, not disclose a pedal device which is tiltable, but still can be used as a conventional pedal device.

To further elucidate the prior art, reference can also be directed to U.S. Pat. No. 4,973,046 disclosing a structure which is somewhat similar to that of U.S. Pat. No. 4,599,917.

OBJECTS AND SUMMARY OF THE INVENTION

It is therefore an object of the present invention to provide a pedal device which can give the pedal device user improved training of the ankle region muscular structure during exercises. According to the invention the device is provided with a second pedal tiltedly attached to the first pedal about an axis extending transversely through a longitudinal axis of said pedal shaft and parallel to said first pedal face approximately midway between an inner and an outer end thereof, wherein said second pedal has a second pedal engagement face facing away from said first pedal engagement face and spaced from said transversely extending axis, and wherein said second pedal is tiltable to either side relative to said first pedal by an acute angle.

According to an embodiment of the pedal device, said acute angle is in the range of 0–35 degrees, preferably in the range 0–20 degrees. In a specific embodiment, said acute angle should not exceed 15 degrees.

Further, resilient means are provided to interact between said first and second pedals to provide a tilting counteracting force. Such resilient means could be spring means provided on said first pedal to engage said second pedal.

Also, on said pedal device said resilient means locate said second pedal engagement face parallel to said first pedal engagement face when said first pedal engagement face is engaged by a foot of a person using said pedal device.

Thus, the invention represents first of all an alternative and medically speaking unique solution for preventing and rehabilitating instability at the ankle joint, but will also in a long-term aspect provide other unique advantages of use for persons using such exercise or training apparatus, both as regards prevention of injury and ability promoting properties. By using the invention on a conventional bicycle and even on a so called off-road-bicycle, an improved "bicycle sensation" will be obtained because the body of the person will be able to move to large extent in step with the bicycle and the ground on which it runs.

Thus, a unique feature of the present invention is that the pedal device has a tiltable pedal surface on one side and the conventional pedal face on the opposite side, thus forming a multi-function pedal, simply by turning the pedal 180 degrees. Thereby, the user will easily determine whether it is to be tiltable pedal or a conventional pedal.

The invention is now to be described with reference to the attached drawing figures forming a typical, non-limiting embodiment of the present invention.

DESCRIPTION OF THE DRAWINGS

FIG. 1 is a side view of the pedal device, according to the invention.

FIG. 2 is a partial sectional view from one side of the device, according to the invention.

DETAILED DESCRIPTION OF THE INVENTION

The pedal device according to the invention has a first pedal body 2 with a conventional pedal shaft 3 to which said first pedal body 2 is rotatably attached. The pedal shaft 3 is rotatably mounted in the pedal body 2 in a manner known per se. The free end of the pedal shaft 3 is attached a crank arm 8, of which only a part is shown on FIG. 1. The connection between the shaft 3 and the crank arm 8 is conventional, e.g. by a threaded connection.

Figure 3:
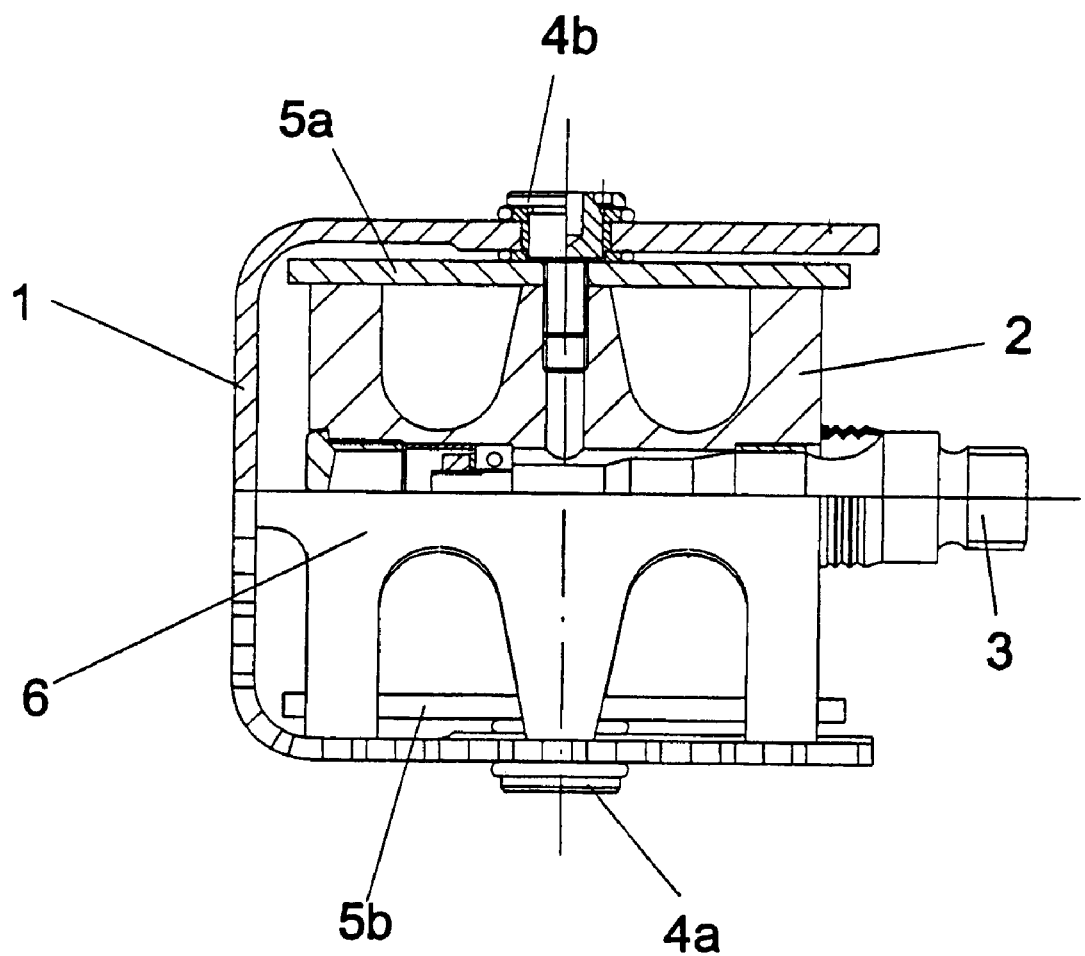
FIG. 3 is a top-view of the device, with half of the device shown in sectional view.
Figures 4A, 4B:
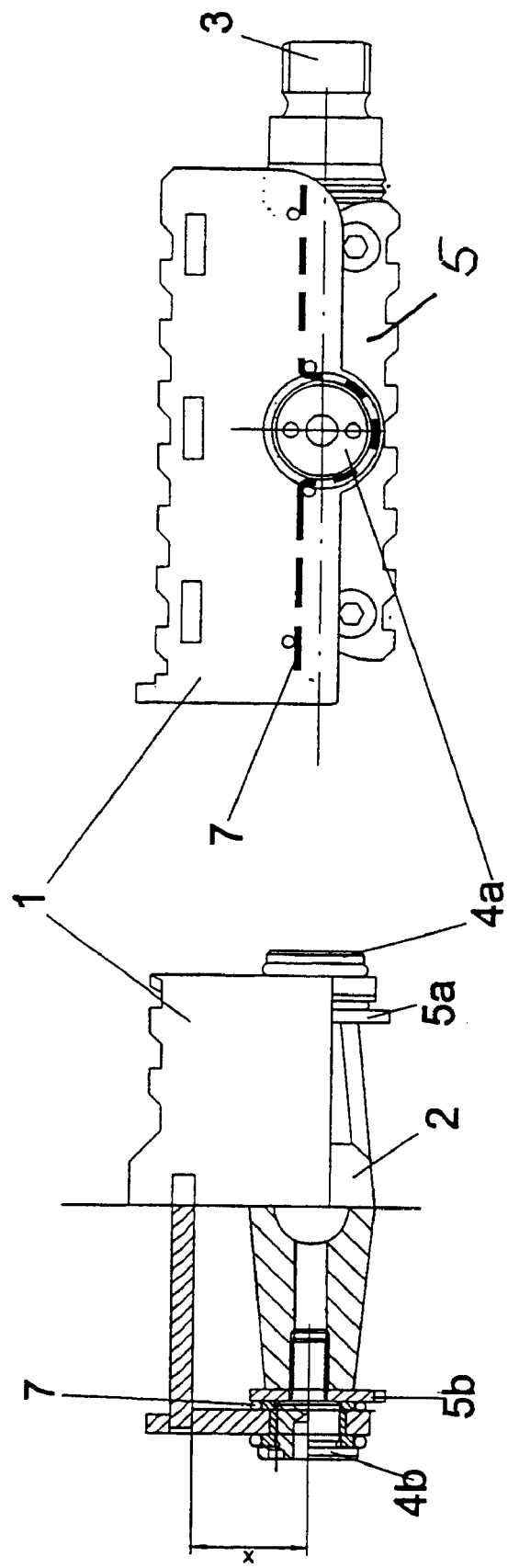
FIG. 4a is an end-view of the device shown in partial sectional view.
FIG. 4b is a side-view similar to the view of FIG. 1.

Parallel to the pedal shaft the pedal body 2 have friction elements 5, shown on FIGS. 3 and 4a as elements 5a and 5b. The pedal body 2 and the elements 5a and 5b represent the conventional part of the pedal device. On one side of the pedal device there has been mounted a tiltable pedal 1 which is attached to the pedal body 2 via pivot connections 4a and 4b through the elements 5b and 5a, respectively. The pivot connections 4a and 4b are suitably shaped as pivot pins extending into the pedal body 2 and attachable to the elements 5b and 5a by thread engagement. The connections 4a and 4b are in the same plane as the pedal shaft 3 and at an angle of 90 degrees thereto.

As shown on FIG. 2, the tiltable pedal 1 will in the embodiment shown be able to tilt by an angle α of approximately 15 degrees to either side about a pivot axis extending through a centre of connections 4a, 4b. The degree figure can however vary, dependent on a distance x between the centre of the pivot connections 4a and 4b and the bottom of the pedal platform or face 6 of the pedal 1. The distance x is dependent on the use which is given priority when carrying out the invention. The tiltable pedal 1 will in its neutral position be forced to be substantially parallel with the pedal body 2 and its elements 5a and 5b by means of resilient means 7, suitably a spring 7. The spring force provided by the spring 7 is dimensioned to only move the tiltable part 1 of the pedal device to a neutral position, as indicated in FIG. 1 and is not primarily designed to provide any substantial resistance against tilting upon its use. However, in case it is required to let the person using the pedal device experience some resistance against tilting of the pedal 1 to one or the other side about a tilting axis through the pins 4a, 4b, it would be obvious to dimension the resilient means or the spring 7 to create such resistance. Although a spring has been shown attached to the pedal 2 and with its ends attached to the tiltable pedal part of the device, other ways of providing such spring force from resilient means can be visualised, e.g. by providing resilient means or spring means between the two pedal parts 1 and 2, e.g. between the lower side of the platform 6 and the opposite face of the pedal body 2.

On the drawings, there is shown a solution which enables the platform of the tiltable pedal body in its position of rest to rotate to a vertical position relative to the ground and a normal position of use of the pedal body 2. This can be done by positioning the pedal shaft a little off-set to the midpoint of the pedal body 2 in the horizontal plane as most clearly seen from viewing FIG. 3. By such off-set positioning of the shaft, it will be easier for the pedal user to choose which side of the pedal device is to be used, as it will only be necessary to rotate the pedal device 90 degrees about the pedal shaft 3 in order to make use of either the engagement face of the pedal body 2 with its element 5*a* and 5*b*, or the tiltable pedal part 1.

What is claimed is:

1. A pedal device for use in a physical training apparatus, the pedal device having a pedal shaft attachable to a pedal crank arm and being rotatable about an axis of rotation extending axially through the pedal shaft, said pedal device comprising, (a) a first pedal member having a foot engagement side and being rotatable about the axis of rotation through the pedal shaft, the first pedal member being intended for use in performing a traditional training exercise, and (b) a second pedal member confronting a side of said first pedal member, opposite said foot engagement side, said second pedal member being tiltably attached to the first pedal member via pivot connections about a tilt axis extending transversely of said axis of rotation and through said axis of rotation, said second pedal member being tiltable about said tilt axis in opposite directions relative to the opposite side of said first pedal member by an acute angle alpha ($\alpha$), (c) and wherein the second pedal member partly surrounds the first pedal member such that the first pedal member is located inside a perimeter of the second pedal member, and at least one spring is provided between the first pedal member and the second pedal member to maintain the second pedal member in a predetermined neutral position when unloaded, said spring being joined to the first pedal member adjacent said tilt axis and having spring legs extending away from said tilt axis in the direction of the pedal shaft for engagement with selected portions of the second pedal member on opposite sides of the tilt axis.

2. The pedal device according to claim 1 wherein said acute angle alpha ($\alpha$) is in the range 0°–35°.

3. The pedal device according to claim 1 wherein said spring is formed to cause the second pedal member to be substantially parallel to the first pedal member when in said neutral position.

4. The pedal device according to claim 1, 2 or 3 wherein said pedal device is installed on a bicycle constituting said physical training apparatus.

5. The pedal device according to 1 wherein said acute angle alpha ($\alpha$) is in the range 0–20 degrees.

6. The pedal device according to 2 wherein said acute angle alpha ($\alpha$) is in the range 0–20 degrees.

\* \* \* \* \*